United States Patent [19]

Burnham

[11] Patent Number: 4,466,586
[45] Date of Patent: Aug. 21, 1984

[54] DIRECTIONAL CONTROL DEVICE FOR AIRCRAFT

[75] Inventor: Robert W. Burnham, Seattle, Wash.

[73] Assignee: The Boeing Company, Seattle, Wash.

[21] Appl. No.: 453,682

[22] Filed: Dec. 27, 1982

Related U.S. Application Data

[63] Continuation of Ser. No. 128,780, Mar. 10, 1980, abandoned.

[51] Int. Cl.³ .............................................. B64B 9/34
[52] U.S. Cl. .................................. 244/75 R; 244/213; 244/90 A; 244/113
[58] Field of Search ................. 244/91, 87, 75 R, 198, 244/199, 213, 90 R, 90 A, 113, 215

[56] References Cited

U.S. PATENT DOCUMENTS

| | | | |
|---|---|---|---|
| Re. 18,882 | 6/1933 | Darbyson | 244/91 |
| 1,749,047 | 3/1930 | St. Louis | 244/91 |
| 2,120,760 | 6/1938 | Lumiere | 244/91 |
| 2,562,905 | 8/1951 | Gadeberg | 244/91 |
| 2,595,363 | 5/1952 | Lee | 244/91 |
| 2,697,568 | 12/1954 | Powers | 244/91 |
| 3,438,597 | 4/1969 | Kasper | 244/91 |

FOREIGN PATENT DOCUMENTS

| | | | |
|---|---|---|---|
| 316637 | 7/1911 | Fed. Rep. of Germany | 244/91 |
| 575471 | 2/1946 | United Kingdom | 244/87 |

*Primary Examiner*—Galen L. Barefoot
*Attorney, Agent, or Firm*—Ronald E. Suter; B. A. Donahue

[57] ABSTRACT

A yaw control arrangement for tailless aircraft utilizing a plurality of rudder-like surfaces which are normally retracted into the surface of an aircraft wing and extended only momentarily on demand to generate a yawing moment. The surfaces are mounted on a wing surface by hinges which are canted with respect to the free stream flow. In this manner, the extended deployed surfaces are given an angle of attack to the free stream flow to produce a lift force at essentially right angles to the longitudinal axis of the aircraft.

5 Claims, 4 Drawing Figures

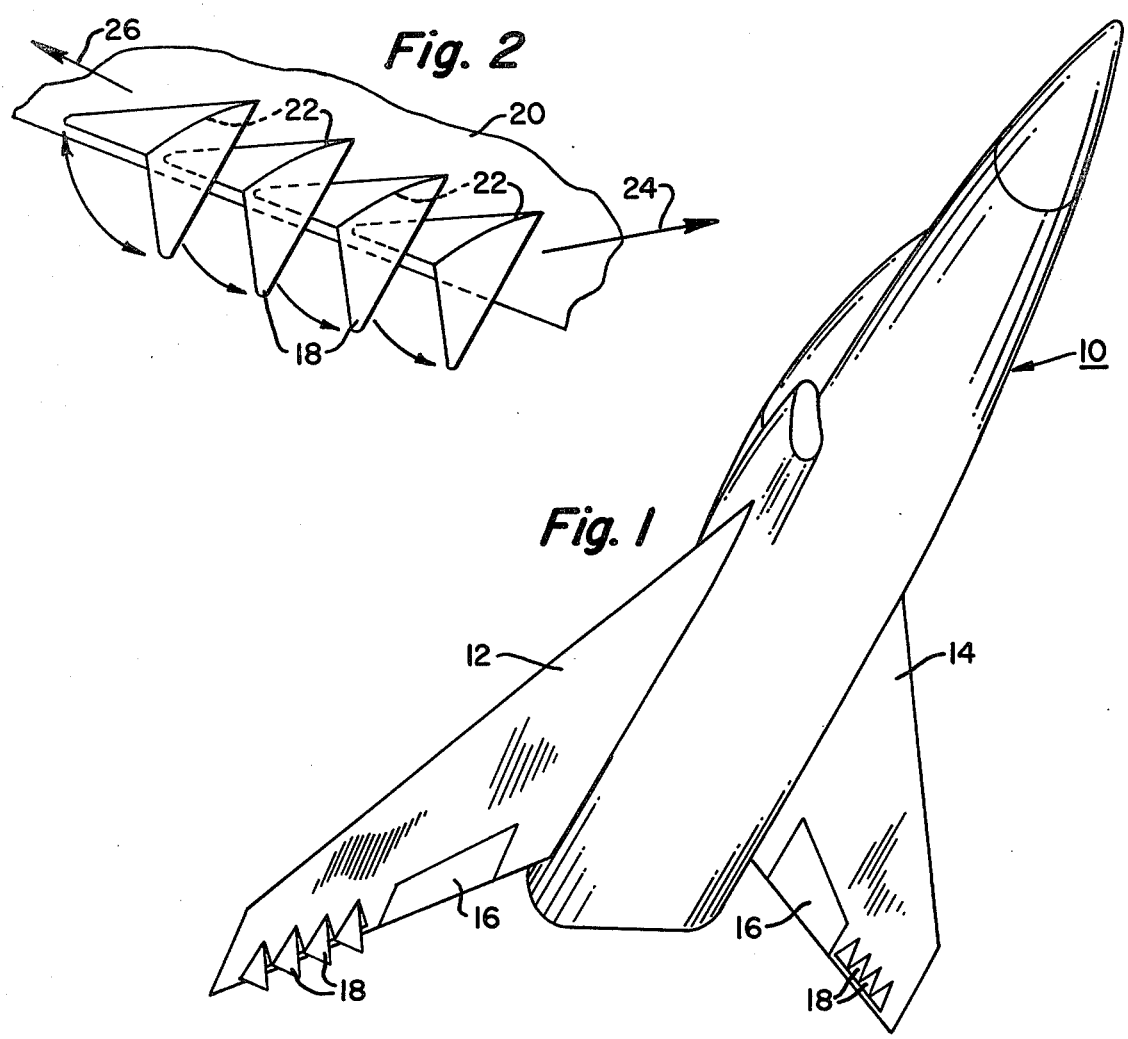
Fig. 2
Fig. 1
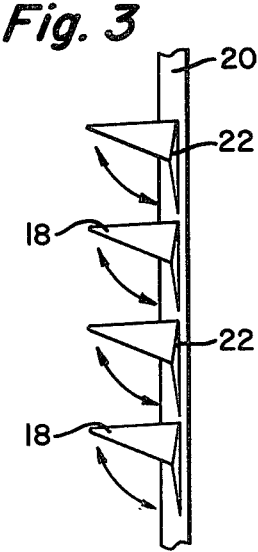
Fig. 3
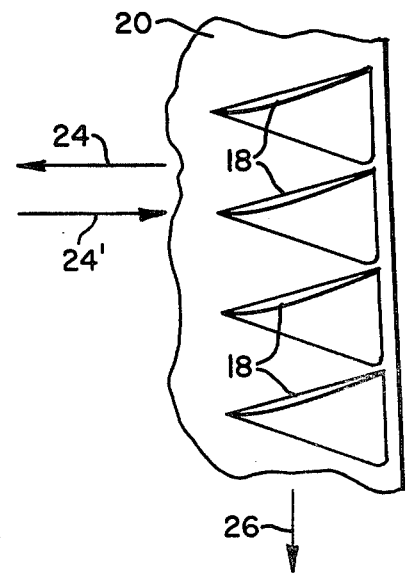
Fig. 4

DIRECTIONAL CONTROL DEVICE FOR AIRCRAFT

The Government has rights in this invention pursuant to Contract No. F33615-77-C-0120 awarded by the Air Force.

This is a continuation of application Ser. No. 128,780, filed Mar. 10, 1980, now abandoned.

BACKGROUND OF THE INVENTION

As is known, tailless airplanes have been devised in the past, typical examples being shown in U.S. Pat. Nos. 3,397,526, 2,539,357 and 2,559,823. Certain prior art tailless aircraft employ a split aileron feature near the wing tips to produce the required yawing moments by increasing the drag on the appropriate side of the aircraft. Such a concept, however, has the dual disadvantage of adding drag and being effective only for wings with relatively high aspect ratios.

U.S. Pat. No. 2,433,649 discloses a rudderless aircraft employing wing tip-mounted spoilers or flaps on a common pivot which produce a yawing moment by adding drag. The aerodynamic drag of such spoilers or flaps, however, is high and the deployed shape can present a highly visible target to some types of detectors. The aforesaid U.S. Pat. No. 2,559,823 discloses a tailless aircraft utilizing paired vanes which pivot about an axis normal to the wing surface to provide a smooth control response. One disadvantage of such vanes, however, is that they are always extended with a rather large total periphery.

SUMMARY OF THE INVENTION

In accordance with the present invention, a new and improved tailless aircraft is provided wherein vertical tail surfaces are normally retracted into a wing surface and extended only momentarily on demand. The arrangement consists of an array of small surfaces on each wing with canted hinge lines such that the extended or deployed surface is given an angle of attack to the free stream flow.

Specifically, there are provided retractable directional control devices in surfaces of the wings of an aircraft, each control device comprising an essentially planar airfoil member hinged to a surface of an associated wing, the hinge connection of the planar member to the wing surface being at an angle with respect to the forward direction of movement of the aircraft. In this manner, when the planar member is rotated outwardly from the wing surface about its hinged connection thereto, a lift force is produced to develop a yawing moment in the aircraft without the generation of substantial drag forces.

The above and other objects and features of the invention will become apparent from the following detailed description taken in connection with the accompanying drawings which form a part of this specification, and in which:

FIG. 1 is a schematic illustration of a tailless aircraft with which the present invention may be used;

FIG. 2 is a perspective view of the underwing surface of the aircraft of FIG. 1 showing the control devices of the invention in their extended or deployed positions;

FIG. 3 is an end view of the wing of the aircraft of FIG. 1 again showing the control devices in their deployed conditions; and FIG. 4 is a bottom or plan view of the control devices of FIG. 3.

With reference now to the drawings, and particularly to FIG. 1, a tailless aircraft 10 is shown having swept-back or delta wings 12 and 14 provided with usual ailerons 16. The yaw control devices of the present invention are identified by the reference numeral 18. These are shown in detail in FIGS. 2-4 and comprise generally triangularly-shaped planar airfoil elements hinged to the surface 20 of the wing along hinges 22 which are skewed or cambered with respect to the direction of flight of the aircraft, this direction being indicated by the arrow 24 and the relative free stream direction being indicated by arrow 24'. Normally, the triangularly-shaped planar surfaces 18 will be folded down into the wing surface 20 by rotation about the hinges 22. However, they can be rotated into the position shown in FIG. 2 wherein the airfoil element is disposed at the proper angle of attack to the free stream flow and a lift force is generated, this lift force being indicated by the arrow 26 in FIGS. 2 and 4. The lift force 26, in turn, creates a yawing moment in the aircraft, causing it to turn with proper manipulation of the ailerons 16.

The present invention thus produces a lift force in the correct direction for the desired yawing moment. The resulting drag is very much less than that of a spoiler or split aileron as employed in prior art tailless aircrafts and is likewise very much less than the lift force generated. In addition, the concept can be effectively applied to very low aspect ratio wings. Inherent in the success of a tailless design is a high gain advanced control system which can tolerate very low or slightly negative directional stability. The surfaces 18 will be deployed rapidly in a modulated manner on demand. Only one or two of the surfaces will need to be extended momentarily in high speed flight to produce a yawing moment. In extreme cases such as engine failure, all of the surfaces in the array on one side of the aircraft can be deployed simultaneously.

Although the invention has been shown in connection with a certain specific embodiment, it will be readily apparent to those skilled in the art that various changes in form and arrangement of parts may be made to suit requirements without departing from the spirit and scope of the invention. In this regard, the shape of the surfaces can be other than triangular, depending upon requirements.

I claim as my invention:

1. In a tail-less aircraft having a wing extending laterally from each side of the fuselage, means for providing side-to-side directional control of the aircraft by generating an appropriately oriented lift force, said means comprising a plurality of retractable airfoil means mounted for movement independently of each other with respect to each wing between a first, retracted, inoperative position, wherein said airfoil means are located in the surface of the respective wing, and a second, extended, operative position, wherein said airfoil means are oriented substantially perpendicular to the respective wing and at the proper angle of attack to produce a lift force acting substantially parallel to the respective wing, said lift force being generated without generation of substantial drag, whereby a desired amount of yawing moment can be produced to provide controlled movement of the aircraft.

2. The combination as set forth in claim 1, wherein said force acts in a direction substantially transverse to the direction of movement of the aircraft.

3. The combination as set forth in claims 1 or 2 wherein each said airfoil means is pivotally mounted relative to its respective wing about an axis forming an acute angle with the direction of free stream flow.

4. The combination as set forth in claim 3 wherein each said airfoil means has a generally triangular configuration.

5. the combination as set forth in claim 4 wherein said airfoil means are small compared to the respective wing.

* * * * *